(No Model.)
E. C. PRICE.
Hammock Support and Tent Frame.
No. 235,809.　　　　Patented Dec. 21, 1880.
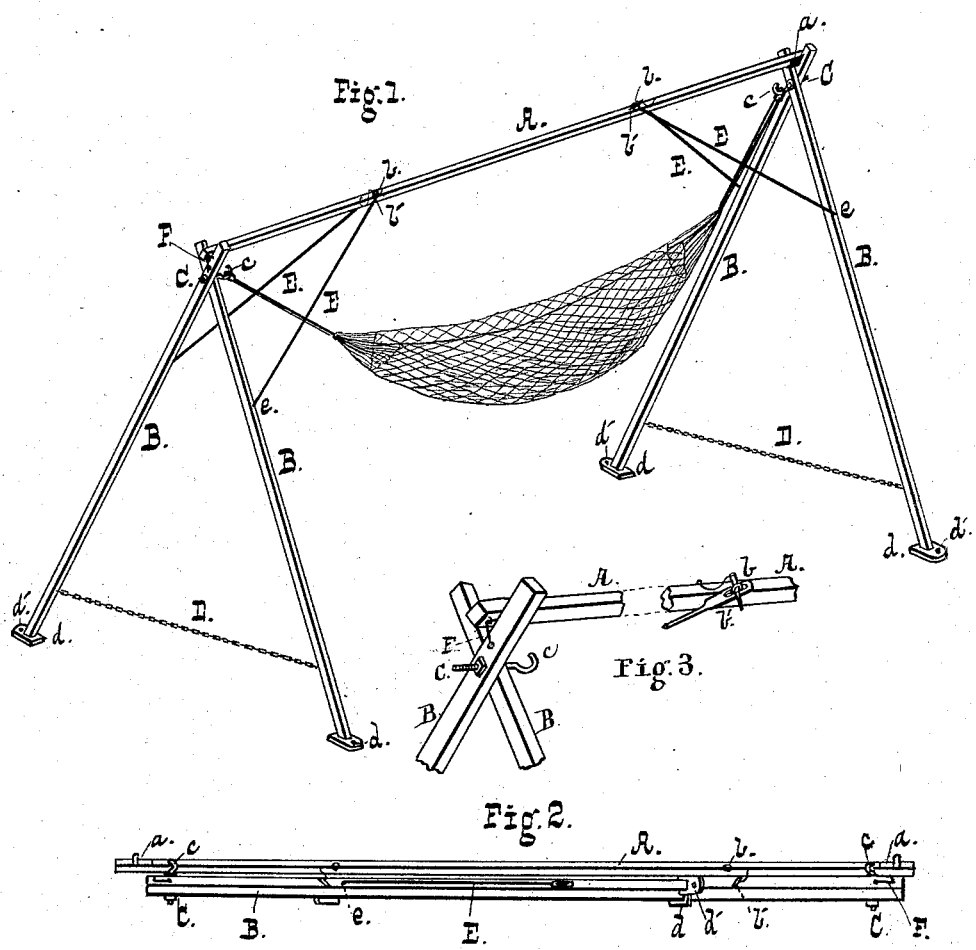
Witnesses,
W. A. Bertram
D. L. H Barclay
Inventor,
Eldridge C. Price.
by
R. D. Williams
Attorney.

UNITED STATES PATENT OFFICE.

ELDRIDGE C. PRICE, OF BALTIMORE, MARYLAND.

HAMMOCK-SUPPORT AND TENT-FRAME.

SPECIFICATION forming part of Letters Patent No. 235,809, dated December 21, 1880.

Application filed July 30, 1880. (No model.)

*To all whom it may concern:*

Be it known that I, ELDRIDGE C. PRICE, of Baltimore city, State of Maryland, have invented certain new and useful Improvements in Hammock-Supports and Tent-Frames; and I hereby declare the same to be fully, clearly, and exactly described as follows, reference being had to the accompanying drawings, in which—

Figure 1 is a perspective view of the device. Fig. 2 is a plan of the same, showing it folded together for transportation; and Fig. 3 is a detailed view, on an enlarged scale, of certain parts of the device.

My invention has for its object to furnish a combined hammock-support and tent-frame adapted as well for indoor as outdoor use, and arranged to fold compactly together.

In the accompanying drawings, A is a bar having near its ends cleats $a$, which abut against the supports B B and prevent any longitudinal motion of the bar. The supports B are pivoted together near their upper ends upon bolts C, having hooks $c$ at their ends, and are furnished with rods E, hinged at $e$ and slotted at their free ends. These slots are passed over screw-eyes $b$ on the bar A and secured by pins $b'$, as shown. Chains D connect the supports B near the bottom and prevent them from spreading, and base-pieces $d$, having holes $d'$, are attached to the lower ends of the supports. Near each end of the bar A is a small screw-eye for the attachment of a hook, F, on one of the supports, the object being to prevent the bar A from lifting. Such is, in general terms, a description of the device.

In operation the supports B B are spread to the extent which the chain D admits of, and the bar A is laid in the top crotch and secured by the hook F and rods E. The operation is repeated at the opposite end, when the device is ready for the attachment of the hammock, as shown.

To fold the device together the pins $b'$ and hooks F are released, the supports B and rods E are swung parallel and laid beside the bar A, the whole being secured together by means of the chains D or a cord. As nearly all the strain is longitudinal, the supports B and bar A may be made quite light, which feature, considered in connection with the compactness of the device when folded, renders it eminently adapted for picnic or excursion use.

It may be set up or taken down in a few minutes, and may be carried about, even when set up for use, by simply lifting it by the bar A, the parts being so braced that they maintain their proper relative positions when lifted clear of the ground. This feature is of especial importance in case of outdoor use, as the device may be readily moved about to keep it in the shade. Moreover, the space subtended by the supports and bar is exactly that inclosed by an ordinary shelter-tent, which may be hung over the device and secured to pins driven through the holes in the base-pieces $d$. These base-pieces subserve also an ulterior end, in preventing the supports from being driven into the ground by the weight of the occupant of the hammock.

Instead of a tent, a mosquito-net may be hung over the support.

What I claim is—

1. In combination with the supports pivoted together, as described, and having tie-rods E, the bar A, having suitable means of securing the tie-rods, as described.

2. The supports B, having chains D, rods E, and hooks F, in combination with the bar A, as set forth.

3. The device herein described, consisting of the supports B, having base-pieces $d$, perforated, as set forth, and provided with hooks F, rods E, and hooks $c$, in combination with the bar A, having points of attachment for the latter, the whole being adapted to fold together, as and for the purpose set forth.

ELDRIDGE C. PRICE.

Witnesses:
R. D. WILLIAMS,
JOHN C. GITTINGER.